May 29, 1934.  A. W. HAWES ET AL  1,961,044
FLUID ACTUATED CLAMP
Filed Dec. 19, 1931

INVENTOR
Austin W. Hawes
BY Alphonzo White
Robt P Hains
ATTORNEY

Patented May 29, 1934

1,961,044

UNITED STATES PATENT OFFICE 1,961,044

FLUID ACTUATED CLAMP

Austin W. Hawes and Alphonzo White, Winchendon, Mass., assignors to Baxter D. Whitney & Son, Inc., Winchendon, Mass., a corporation of Massachusetts Application December 19, 1931, Serial No. 582,096

5 Claims. (Cl. 144—278)

This invention relates to a work holding device and more particularly to fluid controlled mechanism for operating the work clamp.

In wood working machines such for example as shapers it is desirable to provide means that may be quickly actuated to hold the work during the operation of a cutter thereupon and then release the work.

In the William M. Whitney and Alphonzo White application Ser. No. 579,206, filed December 5, 1931, now Patent No. 1,921,715, issued Aug. 8, 1933, is shown, described and claimed fluid controlled clamping mechanism adapted for use upon a wood shaper to hold the work while it is being acted upon by the cutter. The application just mentioned contemplates the use of a liquid such as oil to actuate a piston controlled clamp, and while this constitutes a good practical construction it requires that a fluid tight joint be maintained between the cylinder and piston to prevent the oil from escaping from the cylinder onto the work supporting table or other parts where it may be objectionable.

The present invention, therefore, contemplates a novel construction for confining the operating fluid within a cylinder out of contact with the walls thereof so that the expanding pressure of the fluid will actuate the piston while all danger of the fluid escaping between the cylinder and piston is avoided.

One important feature of the present invention resides in the construction for movably supporting the clamping jaw and for imparting the movement of the piston thereto.

Another important feature of the invention resides in a fluid tight expansion chamber adapted to be mounted in a cylinder so that the pressure of the confined fluid will act upon the sliding piston to shift it, while the fluid is prevented from escaping from the chamber into contact with the walls of the cylinder.

A more specific feature of the invention resides in a fluid tight expansion chamber which has the form of a corrugated metal tube or receptacle that is closed at its end, and which is adapted to expand in the direction of its length as the pressure of the fluid within the chamber is increased.

As a result of the present invention a fluid actuated piston need not be carefully fitted within its cylinder with a fluid tight sliding fit as heretofore, since due to the present construction the actuating fluid does not come in contact with the surfaces of the cylinder or piston, but is separately confined.

The various features of the invention and novel arrangement of parts will be further understood when read in connection with the accompanying drawing illustrating one good practical form thereof.

In the drawing:—

Figure 1:
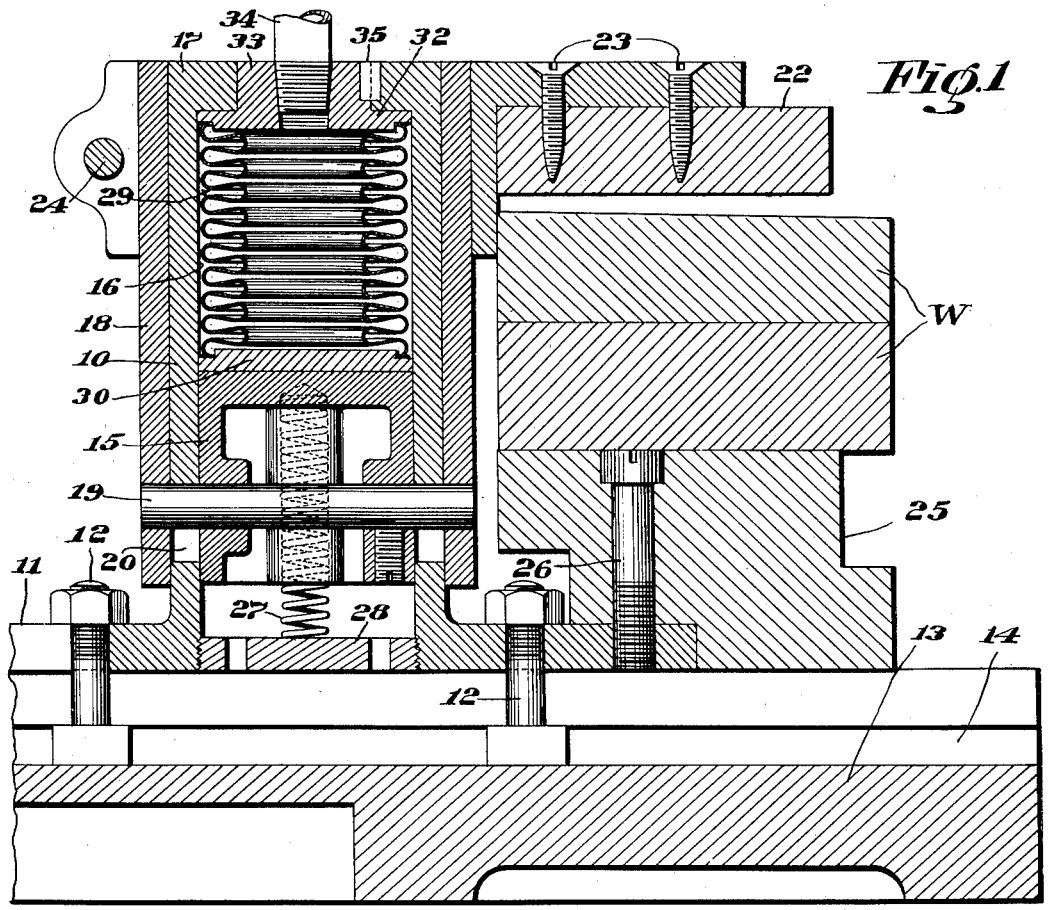
Fig. 1 is a vertical sectional view through a fluid operated clamp constructed in accordance with the present invention.
Figure 2:
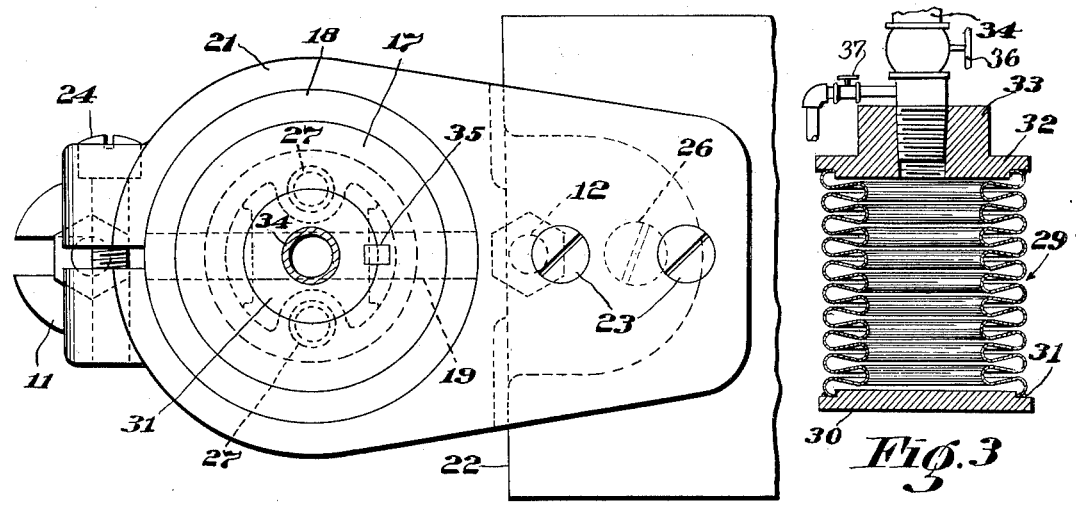
Fig. 2 is a top plan view of the clamping mechanism of Fig. 1.

The fluid actuated mechanism of the present invention comprising a cylinder and piston and an expansion receptacle mounted in the cylinder, may be used for various purposes where it is desired to employ piston actuated means, but since the present device is designed more particularly to actuate a work clamping jaw, this use of the invention is illustrated in the drawing and will now be described.

In the particular embodiment of the invention shown the fluid controlled clamping device is provided with a cylinder 10, the base of which is formed with flanges 11 adapted to receive bolts 12 for clamping the cylinder to the upper face of a work supporting table. The heads of the bolts 12 are shown as positioned within a T-slot 14 of the table.

Within the lower portion of the cylinder 10 is slidably mounted the piston 15, the arrangement being such that a chamber 16 is provided between the piston 15 and the head 17 of the cylinder 10.

The piston 15 in the construction shown serves to actuate the outer column 18 that surrounds and is slidably mounted upon the cylinder 10. Operative movement is imparted to the column from the piston by the transversely extending pin 19 which extends through the piston and through elongated slots 20 formed in the walls of the cylinder, and the ends of the pin are firmly secured to the column 18 as shown.

Secured to the upper portion of the column 18 is the bracket 21 having a laterally extending portion to which the upper jaw 22 is secured by the screws 23, and since it may be desirable to adjust the jaw 22 vertically upon the column 18, the bracket 21 has a split annular portion that embraces the column and is clamped thereabout in the desired position of adjustment by the bolt 24.

The jaw 22 in the construction shown serves to hold the pieces of work W firmly against the lower member 25, which may constitute a cutter profile guide secured to the base 11 by the bolt 26.

A relatively short travel of the piston 15 will be sufficient to actuate the clamp 22 to move it into and out of engagement with the work, and the piston is continuously urged upwardly towards the upper end of its stroke by the compressed springs 27 seated upon the plate 28 and mounted in recesses formed in the lower web structure of the piston.

As above pointed out, an important feature of the invention resides in the construction whereby all danger of the piston operating fluid leaking between the cylinder walls and piston is avoided. This is accomplished by mounting within the cylinder chamber 16 the fluid tight expansion receptacle best shown in Fig. 3.

This receptacle comprises a corrugated expansion tube 29 preferably made of metal, and the lower end of the tube in the construction shown is closed by the plate or disk 30 adapted to rest upon the upper end of the piston 15 and travel therewith. The disk preferably fits within the bore of the cylinder to slide freely therein while the tubing 29 is somewhat smaller in diameter, as shown, to provide a clearance space between the tube and cylinder walls to prevent friction therebetween. The disk may be welded or brazed to the lower end of the tube at 31, and has a portion of reduced diameter that fits within the end of the tube.

The upper end of the tube may be similarly secured to a closure 32 for the upper end of the cylinder, this closure being provided with a portion 33 of reduced diameter adapted to fit within the opening in the annular flange 17 of the cylinder. The operating fluid which may be either a gas or liquid is supplied to the container 29 by the pipe 34, and a key 35 prevents the closure 32 from turning within the cylinder when the pipe is being screwed into the closure.

Figure 3:
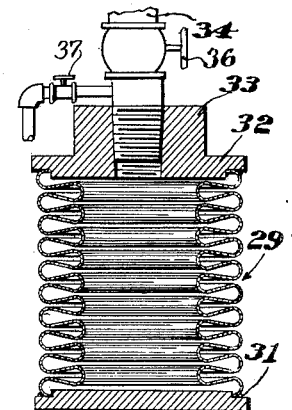
Fig. 3 is a vertical sectional view showing the expansion container removed from the cylinder in which it operates.

The expansion receptacle of Fig. 3 may be introduced into the cylinder through the lower end thereof before the piston is placed therein. The piston is shown in Fig. 1 as held in its elevated position by the pressure of the springs 27 and may be moved downwardly by forcing an operating fluid, such for example as oil, into the expansion receptacle 29 from the pipe 34. This will serve to move the clamp 22 downwardly into firm gripping engagement with the work W.

The admission and discharge of the operating fluid to and from the container 29 may be controlled by any suitable means, and as shown, the supply pipe 34 is provided with a hand operated valve 36, which when opened permits the operating fluid to pass into the container 29 to actuate the clamp, and when closed and the hand valve 37 is opened the fluid may be discharged from container 29 to permit the clamp to release the work under the action of the springs 27.

It will be seen from the foregoing that as a result of the present invention the operating fluid is prevented by the expansion receptacle 29 from escaping into the cylinder.

What is claimed is:—

1. A fluid actuated work holding clamp, comprising a cylinder, a piston mounted in the cylinder for sliding movement, an expansion fluid-tight container interposed between the piston and one end of the cylinder in non-contacting relation with the interior wall of the cylinder, a clamp supporting member mounted for longitudinal sliding movement on the exterior wall of the cylinder, a work clamp mounted on the clamp supporting member, connections between the piston and clamp supporting member, and means normally acting to compress the fluid-tight container when the fluid pressure is lower in the container and move the clamp supporting member in a direction to separate the clamp from the work.

2. A fluid actuated work holding clamp, comprising a cylinder, a piston mounted in the cylinder for sliding movement, an expansion fluid-tight container interposed between the piston and one end of the cylinder in non-contacting relation with the interior wall of the cylinder, a clamp supporting member mounted for longitudinal sliding movement on the exterior wall of the cylinder, a work clamp mounted on the clamp supporting member, connections between the piston and clamp supporting member, and a spring normally acting through the piston in a direction to compress the fluid container when fluid pressure is removed therefrom and move the clamp supporting member to automatically open the clamp.

3. A fluid actuated work holding clamp, comprising a cylinder, a piston mounted in the cylinder for sliding movement, an expansion fluid-tight container interposed between the piston and one end of the cylinder in non-contacting relation with the interior wall of the cylinder, a clamp supporting member mounted for longitudinal sliding movement on the exterior wall of the cylinder, a work clamp mounted on the clamp supporting member, and a pin connecting the piston and clamp supporting member on the exterior of the cylinder.

4. A fluid actuated work holding clamp, comprising, in combination a cylinder having a base portion provided with elongated slots, a piston mounted in the cylinder for sliding movement, an expansion fluid-tight container in the cylinder between the piston and one end of the cylinder in non-contacting relation with the inner wall of the cylinder, a clamp supporting member mounted on the exterior wall of the cylinder for longitudinal sliding movement and having a work clamp, a pin extending through the slots of the cylinder and connecting the piston with the clamp supporting member below the fluid-tight container.

5. A fluid actuated work holding clamp, comprising, in combination a cylinder having a base portion provided with elongated slots, a piston mounted in the cylinder for sliding movement, an expansion fluid-tight container in the cylinder between the piston and one end of the cylinder in non-contacting relation with the inner wall of the cylinder, a clamp supporting member mounted on the exterior wall of the cylinder for longitudinal sliding movement and having a work clamp, a pin extending through the slots of the cylinder and connecting the piston with the clamp supporting member below the fluid-tight container, and means normally acting in opposition to the fluid-tight container for moving the clamp supporting member in a direction to automatically open the clamp when fluid pressure in the container is reduced.

AUSTIN W. HAWES.
ALPHONZO WHITE.